United States Patent

[11] 3,625,457

[72] Inventor James A. Weidenhammer
Poughkeepsie, N.Y.
[21] Appl. No. 880,066
[22] Filed Nov. 26, 1969
[45] Patented Dec. 7, 1971
[73] Assignee International Business Machines Corporation
Armonk, N.Y.

[54] REEL-FEED TAPE DRIVE WITH VELOCITY COMPENSATION
3 Claims, 8 Drawing Figs.

[52] U.S. Cl. .......... 242/201, 242/207
[51] Int. Cl. .......... B11b 15/32, G03b 1/04
[50] Field of Search .......... 242/201-204, 207, 67.5; 74/664, 665, 674, 681, 694

[56] References Cited
UNITED STATES PATENTS
2,965,324 12/1960 Pelton .......... 242/204
3,090,573 5/1963 Matovich, Jr. .......... 242/202

*Primary Examiner*—Leonard D. Christian
*Attorneys*—Hanifin and Jancin and Bernard M. Goldman

ABSTRACT: A capstanless, reel-driven tape drive with little tape speed or recorded density variation. A differential mechanism has its carrier connected to a drive motor and its outputs connected respectively to the two reel spindles to obtain a solely reel-driven tape. A feedback for velocity control is obtained via the tensioned tape.

INVENTOR

JAMES A. WEIDENHAMMER

BY Bernard M. Goldman

ATTORNEY

REEL-FEED TAPE DRIVE WITH VELOCITY COMPENSATION

This invention relates generally to tape drives and particularly to tape drives in which the tape is wholly driven by rotating the takeup reel spindle.

A long existing problem in tape drives has been to maintain a substantially constant tape speed in a reliable drive. It has been long recognized that it is impossible to obtain an absolutely constant tape speed in practice. It has also been recognized that the tape speed requirements differ for voice recordings and digital data recordings. In commercial practice, it has been found satisfactory for digital tape drives to maintain a speed variation of less than ±10 percent of a nominal velocity. Voice recordings require a smaller speed variation tolerance to minimize audio "wow." Conventional tape drives for both voice and digital operation control their speed by capstan engagement of the tape; and their reel drive is only used for maintaining tape tension with respect to the capstan drive means and winding the tape onto the takeup reel.

Capstanless tape drives (wherein a motor is directly connected to a takeup-reel spindle) have long been known in the art, but have been rejected in commercial use because of the problem of maintaining tape velocity variation within required tolerances over the length of the tape on the reel. With direct reel-driven drives, the tape velocity will vary directly with the size of the winding radius on the takeup reel; and the only way to maintain low tape speed variation is to restrict the winding radius to a very small increment which restricts the length of tape to an impractical short length. In prior tape drives in which tape is driven by rotating one of the reels at a fixed angular velocity, the tape speed is therefore a function of the winding radius, and varies over a range proportional to the maximum and minimum winding radii. Thus the tape speed varies by 50 percent for a reel having a 2:1 radius range. The recorded digital density may vary correspondingly by 50 percent with the 2:1 ratio.

In digital drives, slow or gradual changes in velocity are much less significant than changes in output pulse timing. Since in a capstan drive the tape speed is nominally constant, the speed and output frequency variations of concern are usually small amplitude-short term fluctuations, i.e. many cycles per second. In a capstanless or reel-feed drive, however, there is an additional gradual tape speed change as the winding radius changes. When the tape is read back on the same type of capstanless drive that was used for writing, the effects of the gradual change during writing and reading are self-cancelling, so that the output digit rate remains nominally constant, assuming a constant input bit rate. The primary effect of the gradual speed change is the corresponding change in bit spacing on the tape. If a maximum practical recording density is used at the slow speed end of the tape, the density at the high speed end will be considerably less with a resulting loss in data capacity and tape utilization.

The gradual change in linear tape speed is relatively large in conventional reel-feed drives with constant takeup-reel speed. The loss in recording capacity is correspondingly large. An additional disadvantage is a similarly large variation in head signal amplitude, which is proportional to the rate of change of flux. This tends to complicate the detection circuits, or reduce operating margins, or both. It is therefore an object of this invention to provide a differential speed control mechanism which alleviates these disadvantages to a major degree, while retaining the basic reel-feed advantages of mechanical simplicity, ease of loading, reduction of tape wear, and convenient reversibility.

It is another object of this invention to provide a tape drive which can meet the commercial speed-variation tolerances required for digital tape drives.

It is a further object of this invention to provide a capstanless tape drive which provides ease in mounting and removing tapes, which may be contained in standard commercial cassettes.

It is still another object of this invention to provide a tape drive which can obtain satisfactory start-stop performance in some digital environments.

It is a still further object of this invention to provide a tape drive in which this same tape speed is obtained for the opposite extremes of the winding radii on the takeup and supply reels.

It is still another object of this invention to provide a tape drive in which the tape may be driven in either a forward or a backward direction with equal control over speed variation.

It is a feature of this invention to provide a unique differential drive mechanism connection between the tape reels and a drive motor.

The foregoing and other objects, features and advantages of the invention will be apparent from the following more particular description of a preferred embodiment of the invention, as illustrated in the accompanying drawings, in which.

Figures 5A, 5B, 6A, 6B:
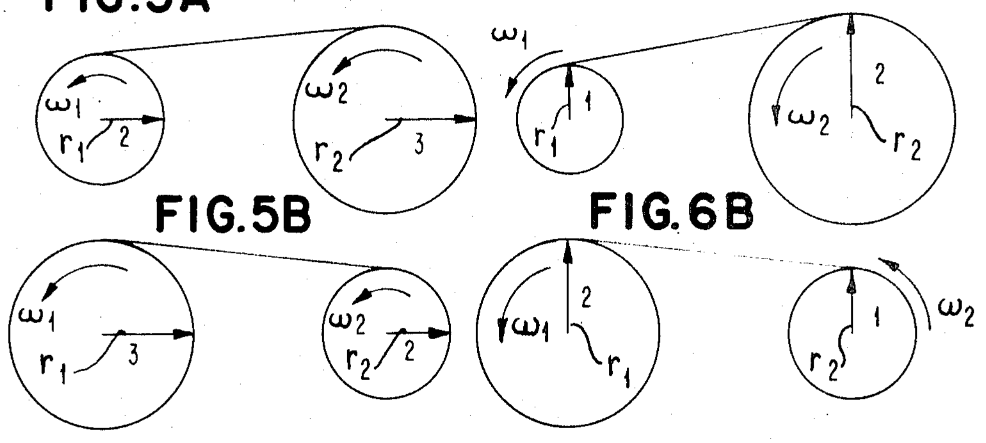

FIGS. 5A and B, and 6A and B are diagrammatic views used in explaining examples of operation of the embodiment.

Figures 1, 2:
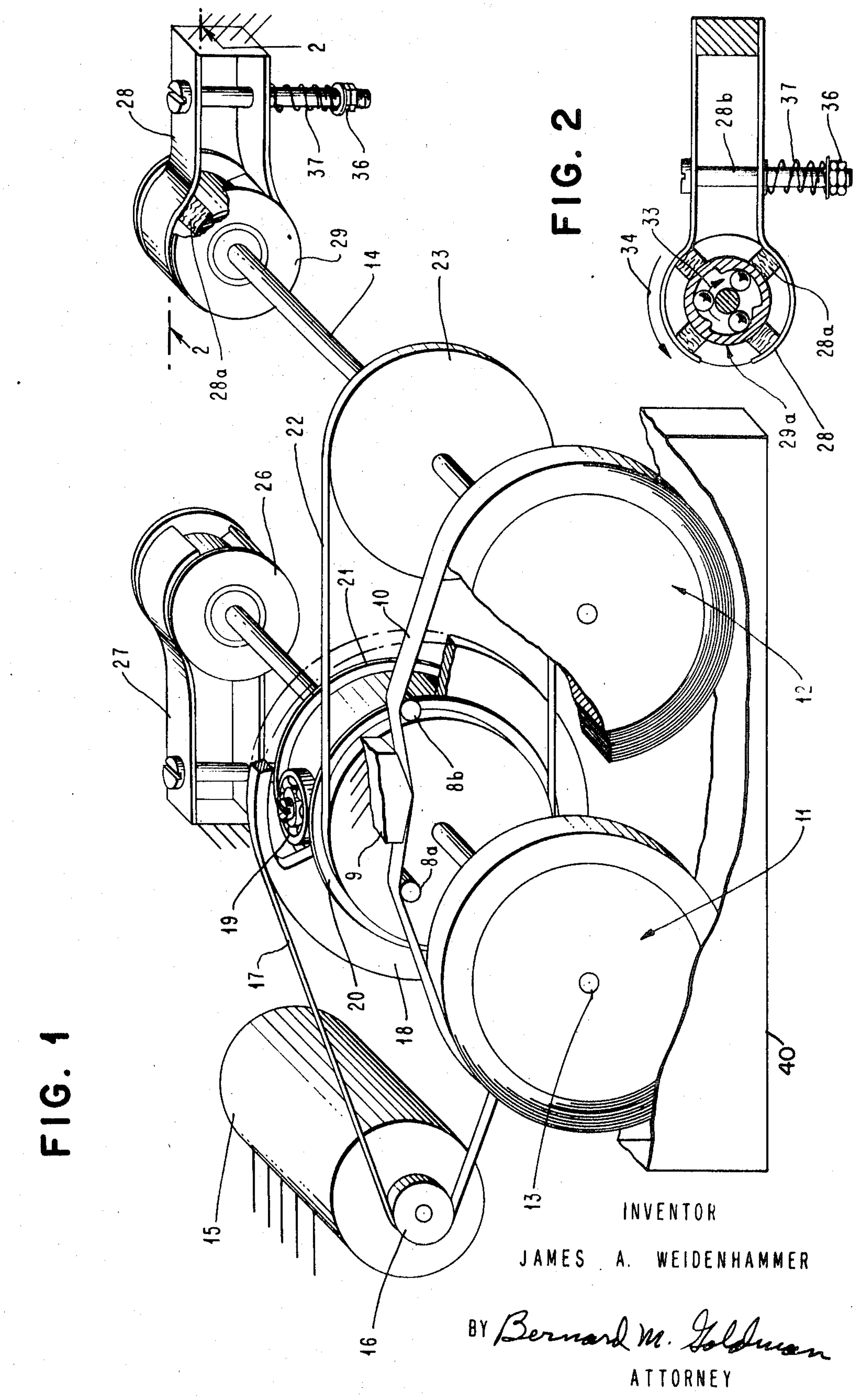
FIG. 1 illustrates a schematic view of an embodiment of the invention.
FIG. 2 is a cross section of section 2—2 of a clutch mechanism found in FIG. 1.
Figure 3:
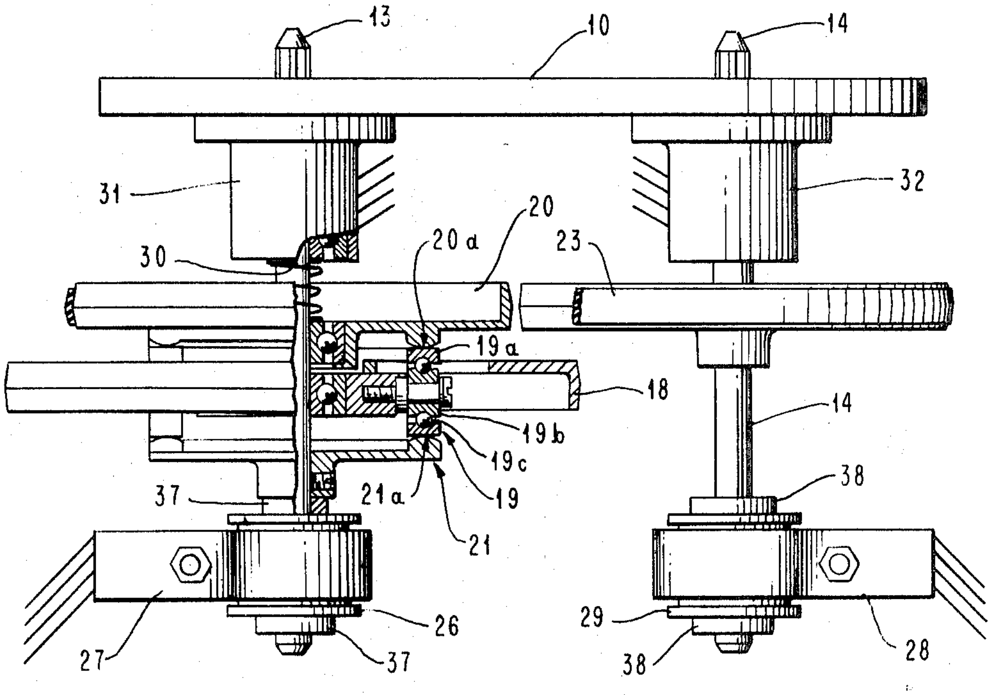
FIG. 3 is a front view of a portion of the mechanism represented in FIG. 1 with a cross-sectional view of part of the differential mechanism.

FIGS. 1 and 3 show a unique reel-feed tape drive incorporating a velocity compensating differential mechanism, which indirectly connects a motor 15 to tape reels 11 and 12, which may be within a cassette of the type normally commercially available at this time. No capstan is provided, since the tape is solely reel-driven. The tape can be driven in either direction with equal velocity compensation.

The tape connection between the reels provides an automatic feedback within the mechanism that varies the angular velocity of both reels in a manner which tends to cancel most of the velocity-varying effect of the changing winding radius. Advantages are obtained such as simplicity of tape path, no capstan, and convenience of loading and threading, while obtaining the controlled-velocity advantages otherwise requiring capstan-driven systems, or complex reel servocontrol.

A pair of bearings 31 and 32 support reel shafts 13 and 14 on a frame. The spindles of a pair of tape reels, preferably in a cassette or cartridge, can easily be engaged with the toothed ends of shafts 13 and 14 by placement thereon.

Motor 15 is connected to the planetary carrier member spider 18 of a differential mechanism. The carrier 18 supports three equally spaced cylindrical rollers 19 which are in rolling engagement with the crowned surfaces 20*a* and 21*a* of disks 20 and 21. Crowned surfaces 20*a* and 21*a* may be either rounded or pointed. The crowned surfaces are pressed against the outer race 19*a* of roller 19 by a coil spring 30 to obtain a nonslipping rolling engagement between rollers 19 and differential output disks 20 and 21.

Disk 21 is fixed to shaft 13 and provides an output from the differential mechanism to reel 11. Disk 20 rotates freely on shaft 13, which acts only to support the disk, which therefore has no direct effect on reel 11. Disk 20 provides the other output of the differential mechanism to the other reel shaft 14 through a belt 22 and a pulley 23 fixed to shaft 14. Each reel shaft 13 and 14 is connected to a dual-resistance clutch 26 and 29, respectively, which have members 27 and 28 held nonrotational by the frame (not shown). Lock rings 37 and 38 hold the assemblage on each shaft 13 and 14.

Each clutch permits its shaft to freewheel in one direction, and to act against a greater torque in the reverse direction. The clutches are oppositely positioned on their shafts so that freewheeling occurs in the shaft direction for its reel receiving tape, and the higher torque occurs in its opposite shaft direction for spinning tape off its reel. Hence either of the two reels which is the acting supply reel will have the greater drag torque on its shaft.

FIG. 2 shows a cross section of clutch 28, 29. It comprises a one-way roller-bearing clutch 29 supported within a friction clutch 28. Thus shaft 14 can rotate freely in the direction of arrow 33 in FIG. 2, but not in the other direction in which the outer surface 29*a* of the one-way clutch rotates against felt pads 28*a* while the one-way clutch is locked with shaft 14 to provide a higher rotational resistance due to the friction of pads 28*a*. The amount of torque in the tape-release direction is adjusted by a nut 36 compressing a spring 37. This adjustment is made to obtain a desired tension of tape 10 against a read/write head 9 supported by the frame. Pins 8*a* and 8*b* may be found within the commercially available cassette represented by the container 40 and supported therewith.

To feed tape from reel 12 to reel 11, for example, motor 15 rotates pulley 16 counterclockwise in FIG. 1, driving differential carrier 18 in the same direction. The cylindrical rollers 19 on the carrier 18 tend to drive disks 20 and 21 correspondingly, which tends to impart a similar rotation to shafts 13 and 14 and reels 11 and 12.

Figure 4:
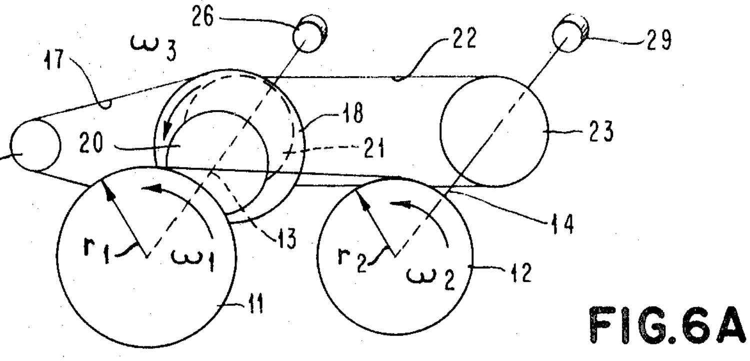
FIG. 4 is a functional representation of the mechanism in FIG. 1.

As shown in FIG. 4, the angular velocities $\omega_1$ and $\omega_2$ of reels 11 and 12 are related in two different ways: (a) through the differential, represented by equation (2) below, and (b) through the tape-tension connection between the winding radii on the two reels, represented by equation (3) when there is no tape slack. For counterclockwise rotation for supply reel 12 in FIG. 1, tape tension is governed by drag from clutch 29, 28 on shaft 14, since this direction of angular rotation locks its one-way clutch 29. The relationship of the angular velocities of reels 11 and 12 with respect to the constant input rotation $\omega_3$ of carrier 18 is provided by the simultaneous equation (1), (2), and (3). It can then be shown that feedback via the tape tension connection between the reels varies the reel speeds $\omega_1$ and $\omega_2$ in a manner which tends to cancel much of the velocity-changing effect due to radii changes. This is represented by equations (6) and (7).

$$\omega_3 = \text{CONSTANT} \quad (1)$$

$$(\omega_1+\omega_2)/2=\omega_3 \quad (2)$$

$$r_1\,\omega_1=r_2\,\omega_2=\text{TAPE VELOCITY} \quad (3)$$

$$\omega_1=(r_2/r_1)\,\omega_2 \quad (4)$$

$$(r_2/r_1)\,(\omega_2+\omega_2)=2\omega_3 \quad (5)$$

$$\omega_2\,(1+r_2/r_1)=2\omega_3 \quad (6)$$

or:

$$\omega_1\,(1+r_1/r_2)=2\omega_3 \quad (7)$$

FIGS. 5A, B and 6A, B illustrate two examples of the effectiveness of the velocity compensation achieved by the differential, for outside/inside reel diameter ratios of 3:2 and 2:1 respectively.

In FIGS. 5A and B, for example, the relative tape velocity varies from a minimum of 2.4 $\omega_3$ at the beginning or end of tape to a maximum of 2.55 $\omega_3$ at the midpoint of the reel capacity. A conventional uncompensated direct-coupled reel-feed tape drive would have a minimum relative tape velocity of 2 $r_1$ $\omega_3$ at beginning of tape, increasing to 3 $r_1$ $\omega_3$ at end of tape for a 50 percent velocity change. Hence for a 3:2 tape radius change, the compensated speed variation is ±3 percent of the average velocity, while the uncompensated variation is ±25 percent.

Since the compensated speed is to a small extent subject to the winding radius variation, larger outside/inside winding diameter ratios result in larger velocity variations but the subject invention continues to show considerable advantage. As shown in FIGS. 6A and B, the relatively large outside/inside winding ratio of 2:1 results in a compensated velocity variation of ±8.6 percent, compared to an uncompensated velocity variation of ±33 percent. Again the invention brings the velocity variation into the commercially useful category.

Feeding in the reverse direction (i.e., clockwise rotation for reel 11 in FIG. 1) is obtained by reversing motor 15 to rotate clockwise. The operation is as previously described, except that clutch 26, 27 is now engaged as the drag clutch by the sliding friction of its felt pads, while clutch 28, 29 now freewheels. Reel 11 is now the supply reel, while reel 12 is the takeup reel. Many variations providing the dual-resistance clutch are known in the art.

The start-stop operation of the tape drive may be controlled by switching the current to motor 15 on and off, respectively. The start-stop performance can be improved by introducing a pulse of current with aiding or opposing polarity, respectively, at start or stop time. The drive also can be operated in a start-stop mode using a clutching and reverse unit (not shown) between motor 15 and pulley 16. With low-inertia parts, fast acceleration and deceleration is attainable by solenoid control of frictionally engageable parts without excessive overshoot or low of tape tension in the drive.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a tape drive mechanism having a rotatable power source and a pair of tape-reel spindles, comprising a differential drive mechanism connected to said rotatable power source, said differential drive mechanism including a carrier, and first and second angular output means connected in rotational engagement with said carrier mechanism, said first angular output means coupled to one of said reel spindles, and said second angular output means coupled to the other of said reel spindles, and a drag clutch coupled to the reel spindle which receives a supply reel.

2. In a tape drive as defined in claim 1 in which either spindle can support a supply reel, also including a pair of unidirectional clutches coupled in opposite directions to said shafts to prohibit free rotation in the supply-reel direction for the connected spindle, and to permit free rotation of its spindle in its takeup reel direction, and torque-generating means connected to each of said unidirectional clutches.

3. In a tape drive mechanism having a rotatable power source and a pair of tape-reel spindles, comprising a differential drive mechanism connected to said rotatable power source, said differential drive mechanism includes a carrier, and first and second angular output means connected in rotational engagement with said carrier mechanism, said differential drive mechanism carrier and output means being supported concentrically on one of said drive spindles, and one of said angular output means being fixed to said one of said drive spindles, the other of said angular output means being rotatable on said one of said drive spindles and drivingly coupled to the other of said drive spindles.

* * * * *